(12) United States Patent
Cheng (10) Patent No.: US 11,661,793 B2
(45) Date of Patent: May 30, 2023

(54) FOLDING SHADE

(71) Applicant: Li-Ming Cheng, Kaohsiung (TW)

(72) Inventor: Li-Ming Cheng, Kaohsiung (TW)

( * ) Notice: Subject to any disclaimer, the term of this patent is extended or adjusted under 35 U.S.C. 154(b) by 328 days.

(21) Appl. No.: 17/015,682

(22) Filed: Sep. 9, 2020

(65) Prior Publication Data

US 2021/0197881 A1 Jul. 1, 2021

(30) Foreign Application Priority Data

Dec. 26, 2019 (CN) .......................... 201911369978.4

(51) Int. Cl.
*E06B 9/50* (2006.01)

(52) U.S. Cl.
CPC ....................................... *E06B 9/50* (2013.01)

(58) Field of Classification Search
CPC ..... E06B 9/40; E06B 9/42; E06B 9/50; E06B 9/56; E06B 9/60; E06B 9/62
See application file for complete search history.

(56) References Cited

U.S. PATENT DOCUMENTS

| | | | | |
|---|---|---|---|---|
| 5,881,792 | A * | 3/1999 | Cheng ....................... | E06B 9/44 160/323.1 |
| 8,408,486 | B2 * | 4/2013 | Di Stefano ............... | E06B 9/50 160/326 |
| 10,364,602 | B2 * | 7/2019 | Kwak ....................... | E06B 9/60 |
| 10,968,695 | B2 * | 4/2021 | Chen ......................... | E06B 9/50 |
| 2004/0099384 | A1 * | 5/2004 | Wu ........................... | E06B 9/68 160/321 |
| 2006/0081746 | A1 * | 4/2006 | Shevick ................. | F16M 13/02 248/254 |
| 2007/0051478 | A1 * | 3/2007 | Wieczorek ................ | E06B 9/42 160/323.1 |
| 2008/0142171 | A1 * | 6/2008 | Koop ........................ | E06B 9/50 160/243 |
| 2009/0223641 | A1 * | 9/2009 | Cheng ....................... | E06B 9/42 160/318 |
| 2010/0122780 | A1 * | 5/2010 | Cheng ....................... | E06B 9/90 160/305 |

(Continued)

FOREIGN PATENT DOCUMENTS

AU 2018247253 A1 * 4/2020
CN 206545471 U * 10/2017 ............... E06B 9/42

(Continued)

*Primary Examiner* — Johnnie A. Shablack
*Assistant Examiner* — Matthew R. Shepherd
(74) *Attorney, Agent, or Firm* — Alan D. Kamrath; Karin L. Williams; Mayer & Williams PC (57) ABSTRACT

A folding shade includes a supporting seat having a first plate and a second plate opposite to the first plate. The first plate has an abutting portion. A rod unit is connected between the first plate and the second plate. The rod unit includes an axle and a transmission rod rotatably disposed around the axle. An annular space is defined between the transmission rod and the axle. A returning element is mounted around the axle and is connected to the transmission rod. The rod unit extends along a longitudinal axis. A braking mechanism is disposed in the annular space. The braking mechanism includes a limiting member. The abutting portion of the first plate releasably abuts against the limiting member to move the limiting member along the longitudinal axis. A shade is coiled around the rod unit.

7 Claims, 6 Drawing Sheets

(56) References Cited

U.S. PATENT DOCUMENTS

| | | | |
|---|---|---|---|
| 2013/0020038 A1* | 1/2013 | Barnes | B60J 1/2016 |
| | | | 242/384.7 |
| 2017/0159359 A1* | 6/2017 | Vries | E06B 9/42 |
| 2018/0051739 A1* | 2/2018 | Cheng | F16C 3/03 |
| 2018/0283091 A1* | 10/2018 | Veatch | B60J 5/125 |
| 2018/0291682 A1* | 10/2018 | Walter-Seifart | E06B 9/68 |
| 2019/0063151 A1* | 2/2019 | Chen | E06B 9/78 |
| 2019/0316414 A1* | 10/2019 | Zhang | E06B 9/322 |
| 2019/0343318 A1* | 11/2019 | Cheng | E06B 9/78 |
| 2019/0345762 A1* | 11/2019 | Cheng | E06B 9/50 |
| 2020/0355028 A1* | 11/2020 | Lai | E06B 9/50 |
| 2022/0081969 A1* | 3/2022 | Wang | E06B 9/42 |

FOREIGN PATENT DOCUMENTS

| | | | | |
|---|---|---|---|---|
| CN | 206801431 U | * | 12/2017 | A47H 5/02 |
| CN | 108425617 A | * | 8/2018 | E06B 9/56 |
| CN | 108691501 A | * | 10/2018 | |
| CN | 109057682 A | | 12/2018 | |
| TW | M270768 U | | 7/2005 | |

\* cited by examiner

FIG. 6

FOLDING SHADE

CROSS REFERENCE TO RELATED APPLICATION

The application claims the benefit of China application serial No. 201911369978.4, filed on Dec. 26, 2019, and the entire contents of which are incorporated herein by reference.

BACKGROUND OF THE INVENTION

1. Field of the Invention

The present invention relates to an article for daily use and, more particularly, to a folding shade.

2. Description of the Related Art

Figure 1:
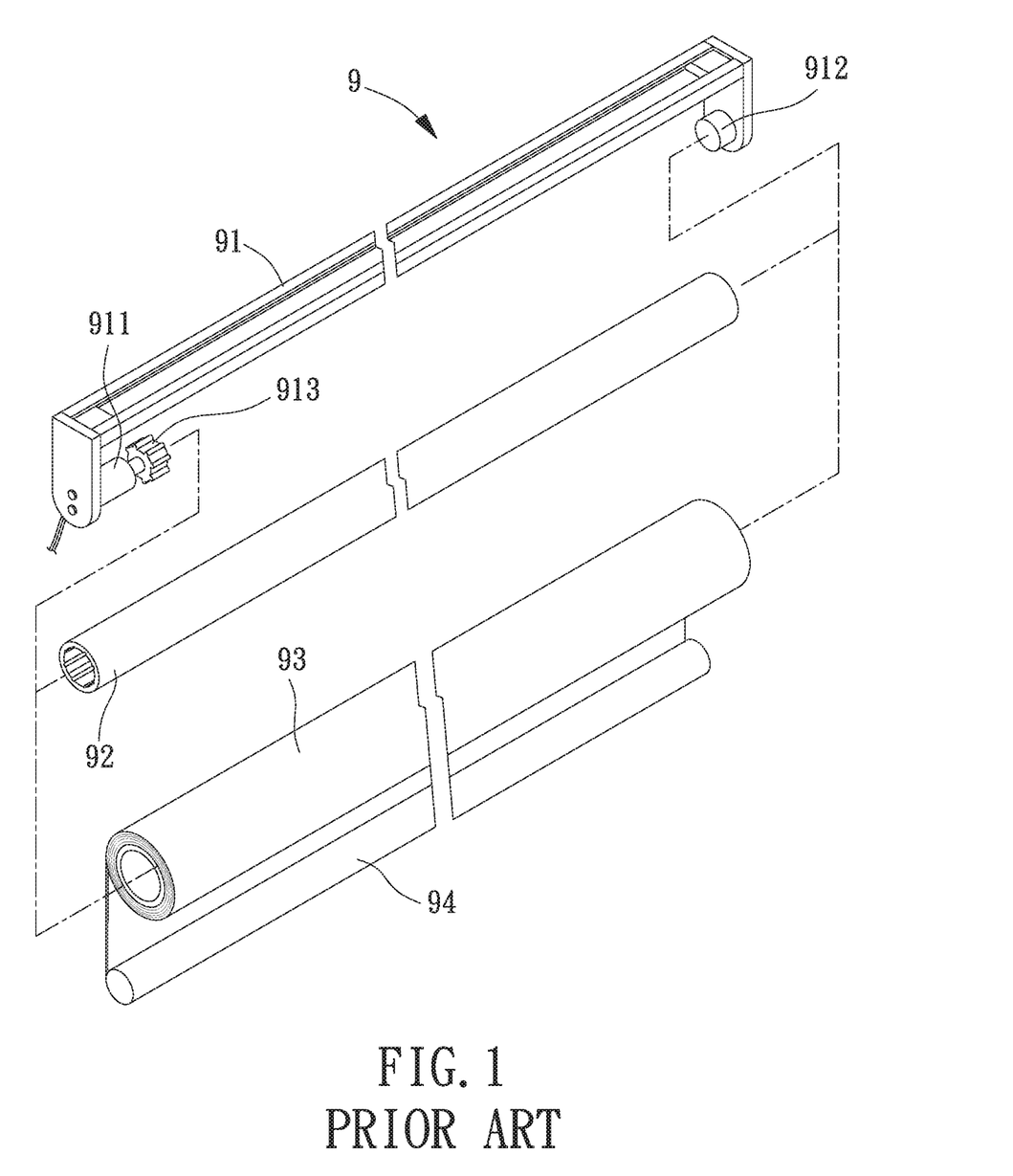
FIG. 1 is an exploded, perspective view of a conventional folding shade.

FIG. 1 shows a conventional folding shade 9 including a U-shaped iron frame 91 directly or indirectly fixed to a fixed object, such as a wall. A motor 911 and a positioning portion 912 are disposed on two ends of the U-shaped iron frame 91, respectively. A rotating shaft 92 is mounted to the U-shaped iron frame 91 and has an end coupled with a transmission member 913 of the motor 911, such that the rotating shaft 92 can be driven by the motor 911 to rotate. Another end of the rotating shaft 92 is coupled to the positioning portion 912. A shade 93 is disposed around an outer periphery of the rotating shaft 92. Specifically, an end of the shade 93 is fixed to the rotating shaft 92, and another end of the shade 93 is coupled to a weight 94. When the rotating shaft 92 rotates, the shade 93 is coiled for folding purposes or released for unfolding purposes.

However, the U-shaped iron frame 91 of the folding shade 9 has a larger overall volume due to the U-shape arrangement. Furthermore, the U-shaped iron frame 91 is made of a metal material and is, thus, heavy. Furthermore, in a case that a user selects a wider shade 93 according to the actual need, the width of the U-shaped iron frame 91 must be the same as the width of the shade 93 and is, thus, more bulky. As a result, assembly of the rotating shaft 92 and the U-shaped iron frame 91 is time-consuming and laborious. Furthermore, it is difficult to fix the U-shaped iron frame 91 to a fixed object, such as a wall, and it is inconvenient to transport the U-shaped iron frame 91.

Thus, a need exists for a novel folding shade that mitigates and/or obviates the above drawbacks.

SUMMARY OF THE INVENTION

To solve the above problems, an objective of the present invention is to provide a folding shade which is helpful in reducing the volume and the weight of a supporting seat to permit rapid assembly or detachment.

Another objective of the present invention is to provide a folding shade with reduced manufacturing costs.

A further objective of the present invention is to provide a folding shade with enhanced engagement reliability.

Still another objective of the present invention is to provide a folding shade with enhanced use convenience.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "one" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select according to desired demands in the material or assembly of the members to be connected.

A folding shade according to the present invention comprises a supporting seat including a first plate and a second plate opposite to the first plate. The first plate has an abutting portion. A rod unit is connected between the first plate and the second plate. The rod unit includes an axle and a transmission rod rotatably disposed around the axle. An annular space is defined between the transmission rod and the axle. A returning element is mounted around the axle and is connected to the transmission rod. The rod unit extends along a longitudinal axis. A braking mechanism is disposed in the annular space. The braking mechanism includes a limiting member. The abutting portion of the first plate releasably abuts against the limiting member to move the limiting member along the longitudinal axis. A shade is coiled around the rod unit.

Thus, in the folding shade according to the present invention, the supporting seat can be coupled with the rod unit by the first plate and the second plate. Since the volumes of the first plate and the second plate are significantly smaller than the conventional U-shaped iron frame, which is helpful in reducing the overall volume and the overall weight of the supporting seat. Thus, the rod unit and the supporting seat can be assembled or detached more rapidly and more conveniently while enhancing the transportation convenience. Furthermore, when the first plate and the rod unit are separate from each other, since the abutting portion of the first plate does not abut against the limiting member, the axle and the transmission rod will not rotate, thereby preventing failure of the returning element in storing energy.

In an example, the first plate and the second plate are made of plastic material. Thus, the weights of the first plate and the second plate can be reduced to further reduce the overall weight of the supporting seat.

In an example, the first plate includes a first coupling portion. The abutting portion is located on an end of the first coupling portion. The axle includes a first coupling section securely mounted to the first coupling portion of the first plate. Thus, the structure is simple and easy to manufacture, reducing the manufacturing costs.

In an example, the first coupling section has an inradius. The axle further includes a reduced section contiguous to the first coupling section. The reduced section has a minimum outer diameter smaller than the inradius, forming an annular groove surrounding the reduced section. The annular groove intercommunicates with the annular space. Thus, the annular groove can be easily formed to enhance the manufacturing convenience.

In an example, the limiting member includes an annular element having a first end face and a second end face opposite to the first end face. The braking mechanism includes an elastic element mounted around the axle. The elastic element abuts against and is located between the second end face of the annular element and a wall portion of the transmission rod. Thus, the structure is simple and easy to assemble, enhancing the assembling convenience.

In an example, when the abutting portion of the first plate abuts against the first end face, the annular element compresses the elastic element and moves along the longitudinal axis to a position aligned with an outer periphery of the reduced section, such that the annular element is located in the annular groove. When the abutting portion of the first plate does not abut against the first end face, the elastic element returns to its original position and moves along the longitudinal axis to the first coupling section, such that the annular element abuts against an outer periphery of the first coupling section. Thus, the annular element can easily move between the reduced section and the first coupling portion, enhancing the operational smoothness.

In an example, the transmission rod includes at least one coupling groove. The limiting member includes at least one coupling portion coupled with the at least one coupling groove of the transmission rod. Thus, the limiting member and the transmission rod can be securely coupled, such that the limiting member can be driven by the transmission rod to rotate synchronously, enhancing the engagement reliability.

In an example, the rod unit includes a tube mounted around the axle and the transmission rod. An end of the shade is fixed to the tube. Another end of the shade is coupled to a weight. Thus, the shade can be folded or unfolded relative to the tube, enhancing the use convenience.

In an example, the transmission rod includes a plurality of first engaging portions on an outer periphery thereof. The tube includes an inner periphery having a plurality of second engaging portions coupled with the plurality of first engaging portions. Thus, the tube can rotate synchronously with the transmission rod, enhancing the operational smoothness.

In an example, the transmission rod includes a connecting portion located on an end thereof distant from the first plate. An end of the returning element is securely attached to the connecting portion. Another end of the returning element is securely attached to an end of the axle. Thus, when a user pushes the shade upwards by the other end of the shade coupled with the weight, the transmission rod can be returned by the torsional force of the returning element, such that the shade can be coiled, enhancing the operational smoothness.

The present invention will become clearer in light of the following detailed description of illustrative embodiments of this invention described in connection with the drawings.

DETAILED DESCRIPTION OF THE INVENTION

Figure 2:
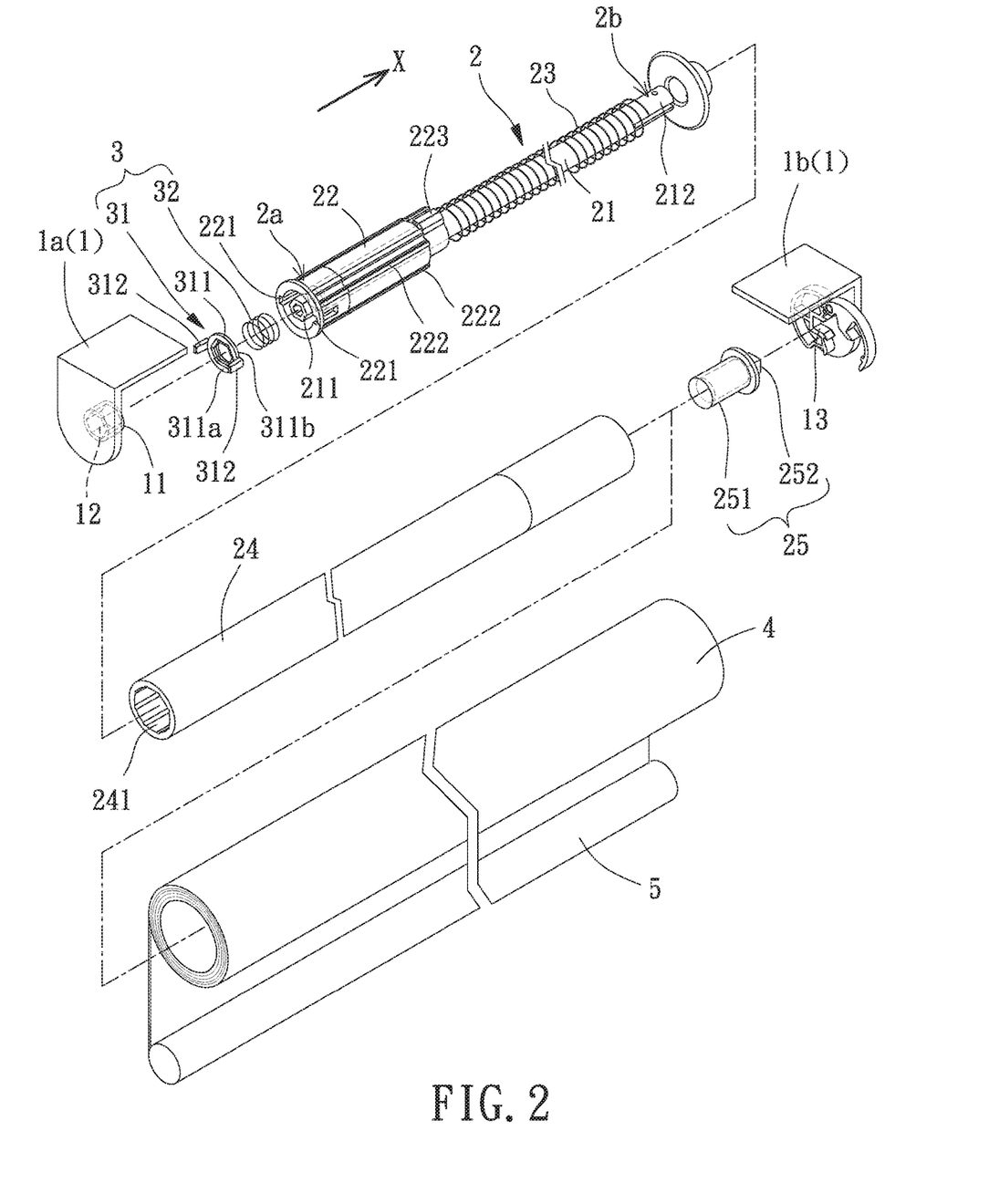
FIG. 2 is an exploded, perspective view of an embodiment of a folding shade according to the present invention.

With reference to FIG. 2, a folding shade of an embodiment according to the present invention comprises a supporting seat 1, a rod unit 2, a braking mechanism 3, and a shade 4. The rod unit 2 is connected to the supporting seat 1. The braking mechanism 3 is disposed in the rod unit 2. The shade 4 is coiled around the rod unit 2.

The supporting seat 1 includes a first plate 1a and a second plate 1b opposite to the first plate 1a. The first plate 1a and the second plate 1b can be directly or indirectly fixed to a fixed object, such as a wall having a window. The first plate 1a and the second plate 1b are preferably made of non-metal material. In this embodiment, the first plate 1a and the second plate 1b are integrally formed by plastic material to reduce the overall weight of the supporting seat 1. Furthermore, the first plate 1a has an abutting portion 11 extending towards the second plate 1b.

Specifically, each of the first plate 1a and the second plate 1b can be in the form of a sheet or bent to form an L-shaped plate. In this embodiment, each of the first plate 1a and the second plate 1b can be in the form of an inverted L-shaped plate. The first plate 1a includes a first coupling portion 12, and the abutting portion 11 is located on an end of the first coupling portion 12. The second plate 1b includes a second coupling portion 13 aligned with the first coupling portion 12. The forms of the first coupling portion 12 and the second coupling portion 13 are not limited in the present invention and should not be restricted to the forms shown in the figures illustrating this embodiment. In this embodiment, the first coupling portion 12 is in the form of a ring, and the second coupling portion 13 is in the form of an openable buckle.

Figure 3:
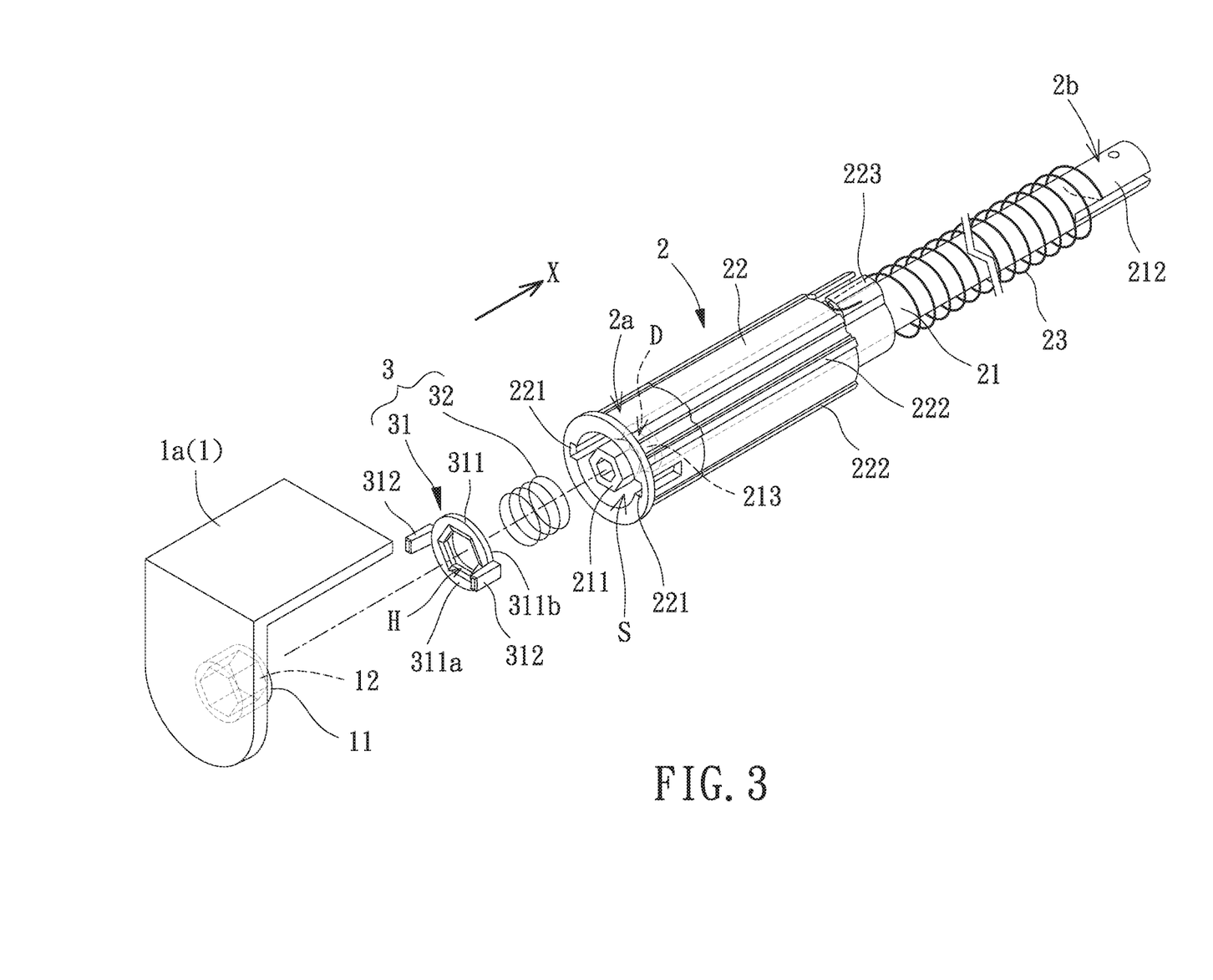
FIG. 3 is an enlarged view of a portion of the folding shade of FIG. 2.
Figure 5:
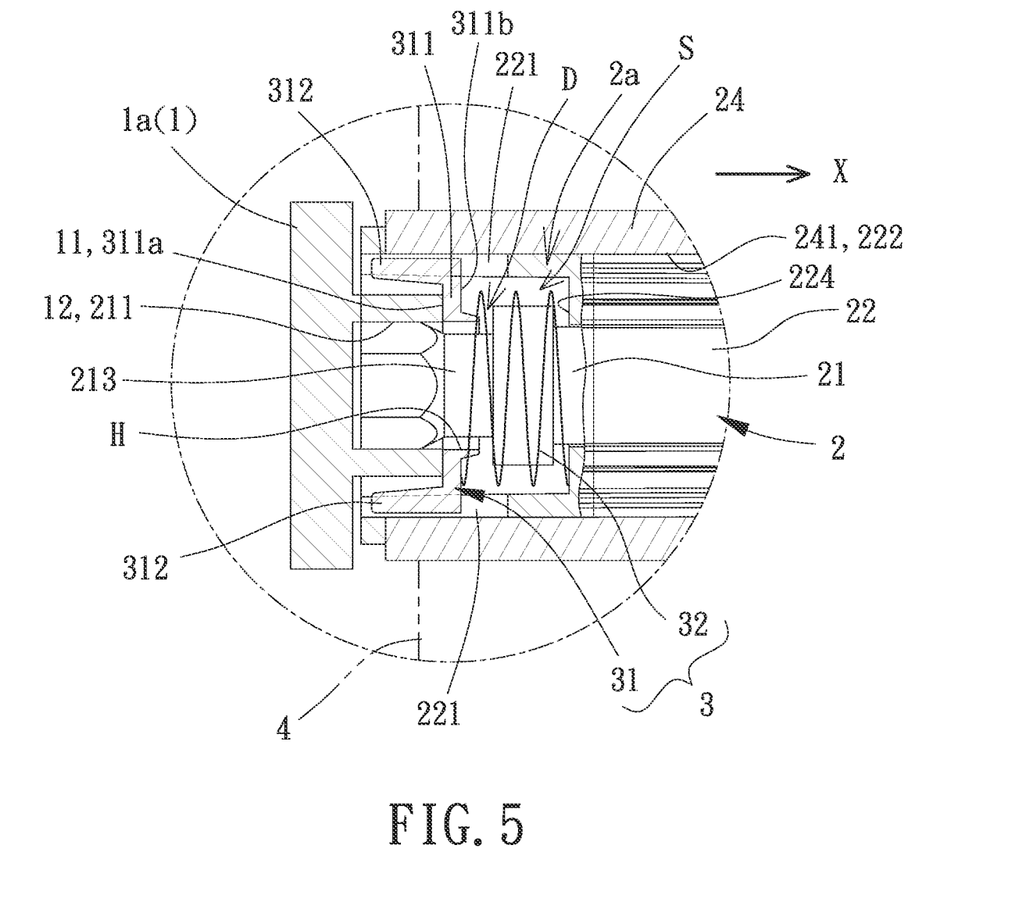
FIG. 5 is an enlarged view of a circled portion of FIG. 4.

With reference to FIGS. 2, 3, and 5, the rod unit 2 is connected between the first plate 1a and the second plate 1b. The rod unit 2 includes a first end 2a and a second end 2b spaced from the first end 2a along a longitudinal axis X. The first end 2a of the rod unit 2 is connected to the first plate 1a. The second end 2b of the rod unit 2 is connected to the second plate 1b. Specifically, the rod unit 2 includes an axle 21 having a first coupling section 211 and a second coupling section 212 opposite to the first coupling section 211. The first coupling section 211 is securely coupled to the first coupling portion 12 of the first plate 1a. The first coupling section 211 includes an outer periphery preferably having non-circular cross sections. The first coupling section 211 has an inradius. In this embodiment, the first coupling section 211 has hexagonal cross sections. The axle 21 further has a reduced section 213 contiguous to the first coupling section 211. The reduced section 213 has a minimum outer diameter preferably smaller than the inradius, forming an annular groove D surrounding the reduced section 213, as shown in FIG. 5.

Figure 4:
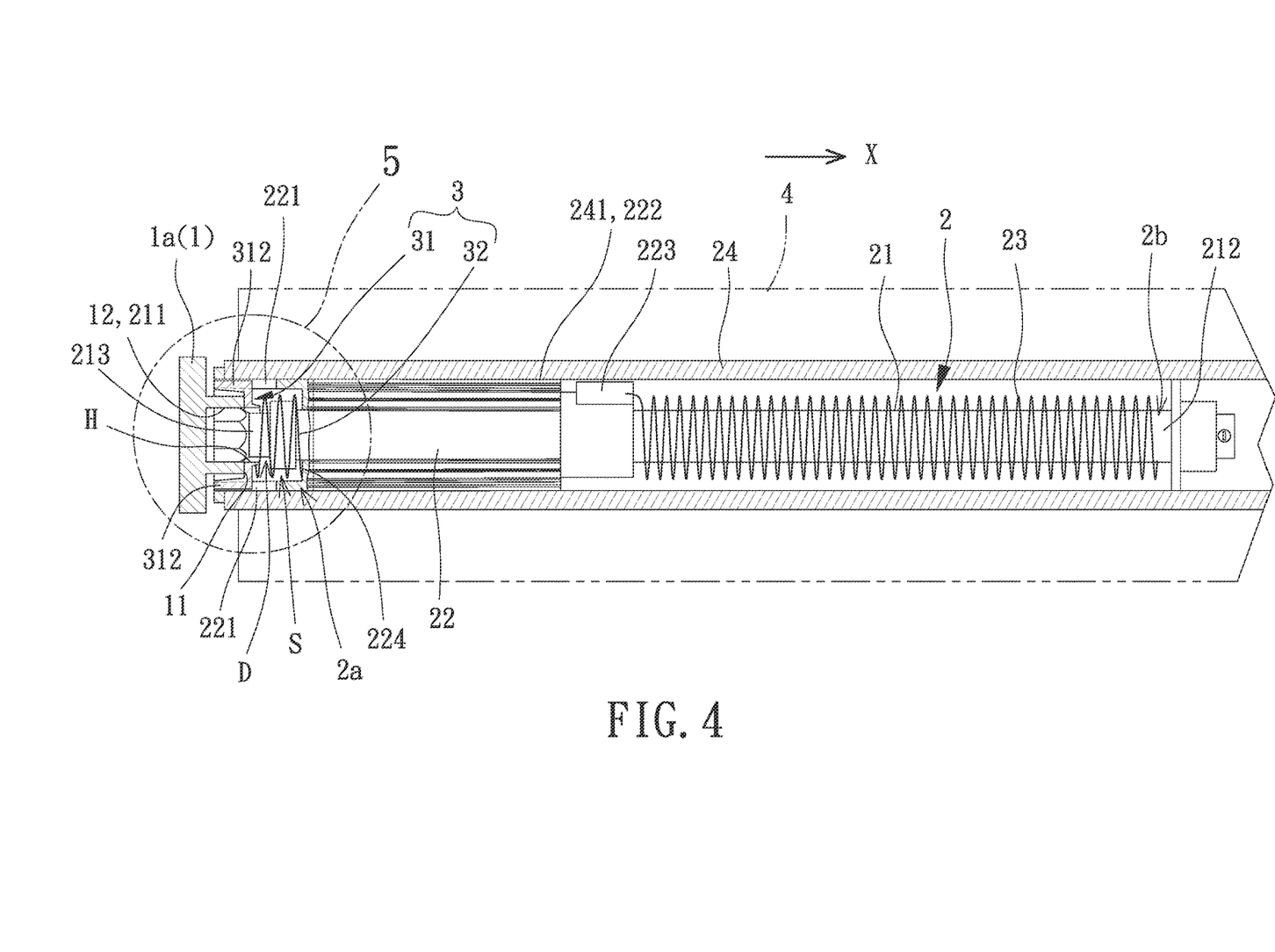
FIG. 4 is a cross sectional view of the folding shade of FIG. 2 after assembly.

With reference to FIGS. 3-5, the rod unit 2 further includes a transmission rod 22 rotatably disposed around the axle 21. The transmission rod 22 is located on the first end 2a. An annular space S is defined between the transmission rod 22 and the axle 21 and intercommunicates with the annular groove D. The transmission rod 22 includes at least one coupling groove 221 facing the first plate 1a. In this embodiment, the transmission rod 22 includes two coupling grooves 221. The transmission rod 22 includes a plurality of first engaging portions 222. The plurality of first engaging portions 222 can be protrusions on the outer periphery thereof or recesses in an inner periphery thereof. The present invention is not limited in this regard. In this embodiment, the plurality of first engaging portions 222 are ribs on the outer periphery of the transmission rod 22. The transmission rod 22 further includes a connecting portion 223 located on an end thereof distant from the first plate 1a.

With reference to FIGS. 3 and 4, the rod unit 2 further includes a returning element 23 that can be in the form of a torsion spring. The returning element 23 is mounted around the axle 21 and connected to the transmission rod 22. An end of the returning element 23 is securely attached to the connecting portion 223. Another end of the returning element 23 is securely attached to an end of the axle 21.

With reference to FIGS. 2 and 4, the rod unit 2 further includes a tube 24 mounted around the axle 21 and the transmission rod 22. The tube 24 includes a plurality of second engaging portions 241 which can be protrusions on an inner periphery of the tube 24 or recesses in an outer periphery of the tube 24. The present invention is not limited in this regard.

In this embodiment, the plurality of second engaging portions 241 are grooves, with the number of the grooves being the same as the number of the plurality of first engaging portions 222. Thus, the plurality of second engaging portions 241 can be respectively coupled with the plurality of first engaging portions 222 to permit joint rotation of the tube 24 and the transmission rod 22. The rod unit 2 can further include a cap 25 connected to the tube 24 and the second plate 1b. The cap 25 includes a housing 251 coupled in the tube 24, providing a tight fitting between an outer periphery of the housing 251 and an inner periphery of the tube 24, permitting synchronous rotation of the housing 251 and the tube 24. The cap 25 further includes a positioning stub 252 received in the housing 251 and having an end protruding beyond the cap 25. Thus, the positioning stub 252 can be securely coupled to the second coupling portion 13 of the second plate 1b.

With reference to FIGS. 3-5, the braking mechanism 3 is disposed in the annular space S. The braking mechanism 3 includes a limiting member 31. Specifically, the limiting member 31 includes an annular element 311 having a through-hole H that is preferably hexagonal, such that the annular element 311 can be mounted around the first coupling section 211 of the axle 21. The limiting member 31 includes at least one coupling portion 312 connected to an outer periphery of the annular element 311. The at least one coupling portion 312 is coupled with the at least one coupling groove 221 of the transmission rod 22 to reliably couple the limiting member 31 with the transmission rod 22.

Particularly, the annular element 311 includes a first end face 311a and a second end face 311b opposite to the first end face 311a. The first end face 311a faces the first plate 1a, and the second end face 311b faces the second plate 1b. The abutting portion 11 of the first plate 1a releasably abuts against the first end face 311a of the annular element 311 to move the limiting member 31 along the longitudinal axis X. Furthermore, the braking mechanism 3 includes an elastic element 32 mounted around the axle 21. The elastic element 32 abuts against and is located between the second end face 311b of the annular element 311 and a wall portion 224 of the transmission rod 22. Thus, when the abutting portion 11 of the first plate 1a abuts against the first end face 311a of the annular element 311, the annular element 311 compresses the elastic element 32 and moves along the longitudinal axis X to a position aligned with an outer periphery of the reduced section 213, such that the annular element 311 is located in the annular groove D, as shown in FIG. 5. On the other hand, when the abutting portion 11 of the first plate 1a does not abut against the first end face 311a of the annular element 311, the elastic element 32 returns to its original position and moves the annular element 311 along the longitudinal axis X to the first coupling section 211, such that the annular element 311 abuts against the outer periphery of the first coupling section 211, as shown in FIG. 6.

With reference to FIGS. 2 and 4, the shade 4 is coiled around the tube 24 of the rod unit 2. An end of the shade 4 is fixed to the tube 24. The end of the shade 4 and the tube 24 can rotate synchronously, such that the shade 4 can be coiled upwards for folding purposes or released downwards for unfolding purposes. Another end of the shade 4 is coupled to a weight 5.

With reference to FIGS. 2, 4, and 5, by the above structure, the rod unit 2 can be mounted on the supporting seat 1. The abutting portion 11 of the first plate 1a abuts against the first end face 311a of the annular element 311, such that the annular element 311 can move to the position aligned with the outer periphery of the reduced section 213. In use, a user can pull the shade 4 downwards by the other end of the shade 4 coupled to the weight 5. The tube 24 actuates the transmission rod 22 to rotate synchronously, such that the transmission rod 22 and the limiting member 31 rotate relative to the axle 21, unfolding the shade 4. Since the end of the returning element 23 is securely attached to the connecting portion 223, the returning element 23 is twisted by the transmission rod 22. When the user pushes the shade 4 upwards by the other end of the shade 4 coupled to the weight 5, the transmission rod 22 is returned under the action of the torsional force of the returning element 23. Thus, the transmission rod 22 can actuate the tube 24 to rotate synchronously, thereby folding the shade 4.

Figure 6:
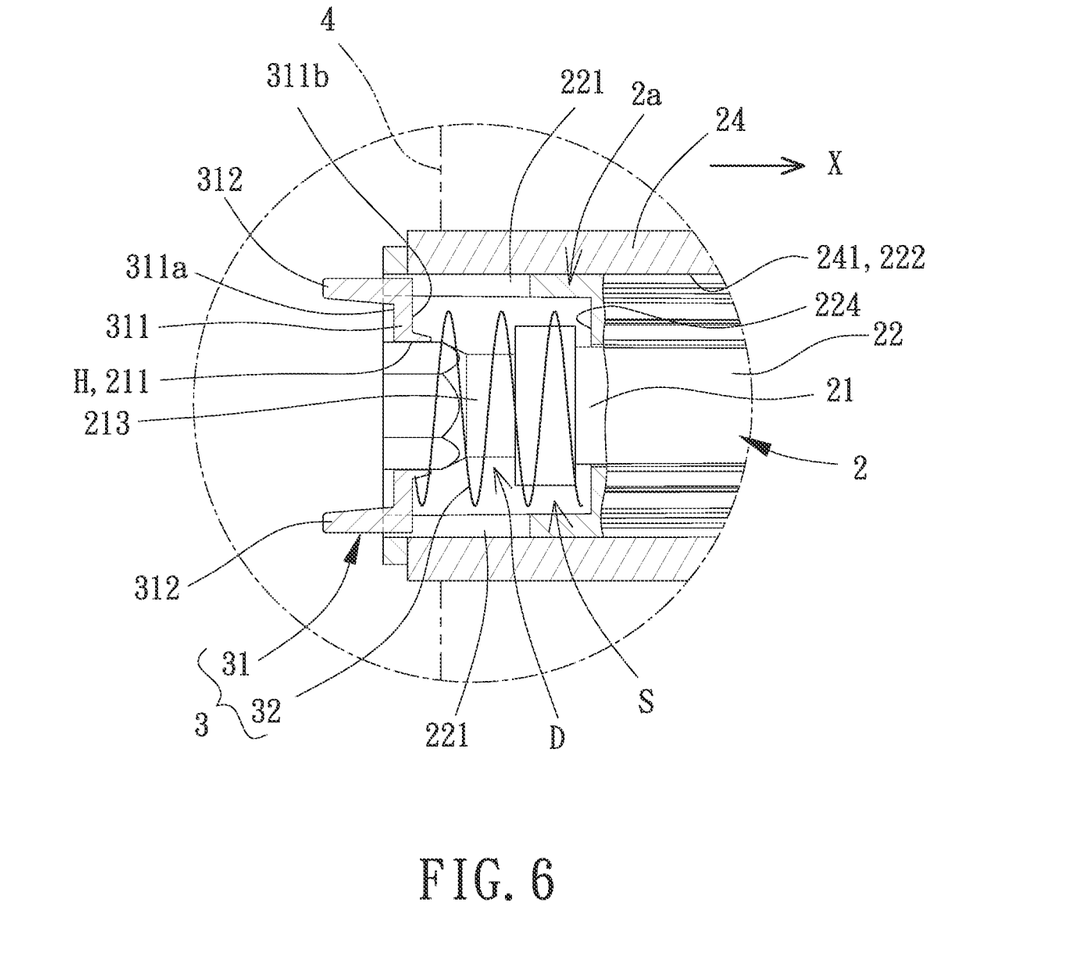
FIG. 6 is a view similar to FIG. 5, illustrating operation of the folding shade.

With reference to FIGS. 2 and 6, it is further noted that before the supporting seat 1 is mounted, the braking mechanism 3 is in an initial position shown in FIG. 6. Namely, the first plate 1a and the rod unit 2 are separate from each other. In a case that, the user has his or her personal favorite taste, style, or color or intends to match with the decoration, the user can purchase a rod unit 2 already coupled with a braking mechanism 3 at a mall and then mount the rod unit 2/braking mechanism 3 to a supporting seat 1 on a fixed object, such as a wall with a window at home, enhancing the use convenience. Specifically, when the abutting portion 11 of the first plate 1a does not abut against the first end face 311a of the annular element 311, the elastic element 32 returns to its original position and pushes the annular element 311 to the outer periphery of the first coupling section 211. At this time, the annular element 311 abuts against the outer periphery of the first coupling section 211, such that the annular element 311 can restrain the axle 21 to thereby prevent rotation of the axle 21. Furthermore, the at least one coupling portion 312 engages with the at least one coupling groove 221 of the transmission rod 22, such that the annular element 311 can restrain the transmission rod 22 to thereby prevent rotation of the transmission rod 22. Thus, both the axle 21 and the transmission rod 22 do not rotate to prevent relative rotation between the tube 24 and the axle 21, thereby preventing failure of the returning element 23 in storing energy.

In view of the foregoing, in the folding shade according to the present invention, the supporting seat 1 can be coupled with the rod unit 2 by the first plate 1a and the second plate 1b. Since the volumes of the first plate 1a and the second plate 1b are significantly smaller than the conventional U-shaped iron frame 91, which is helpful in reducing the overall volume and the overall weight of the supporting seat 1. Thus, the rod unit 2 and the supporting seat 1 can be assembled or detached more rapidly and more conveniently while enhancing the transportation convenience. Furthermore, when the first plate 1a and the rod unit 2 are separate from each other, since the abutting portion 11 of the first plate 1a does not abut against the limiting member 31, the axle 21 and the transmission rod 22 will not rotate, thereby preventing failure of the returning element 23 in storing energy.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A folding shade comprising:
   a supporting seat including a first plate and a second plate opposite to the first plate, wherein the first plate has an abutting portion and a first coupling portion, wherein the abutting portion is located on an end of the first coupling portion;
   a rod unit connected between the first plate and the second plate, wherein the rod unit includes an axle and a transmission rod rotatably disposed around the axle, wherein the axle includes a first coupling section securely mounted to the first coupling portion of the first plate and has an inradius, wherein an annular space is defined between the transmission rod and the axle, wherein a returning element is mounted around the axle and is connected to the transmission rod, wherein the rod unit extends along a longitudinal axis, wherein the axle further includes a reduced section contiguous to the first coupling section, wherein the reduced section has a minimum outer diameter smaller than the inradius, forming an annular groove surrounding the reduced section, and wherein the annular groove intercommunicates with the annular space;
   a braking mechanism disposed in the annular space, wherein the braking mechanism includes a limiting member, wherein the abutting portion of the first plate releasably abuts against the limiting member to move the limiting member along the longitudinal axis, wherein the limiting member includes an annular element having a first end face and a second end face opposite to the first end face, wherein the braking mechanism includes an elastic element mounted around the axle, and wherein the elastic element abuts against and is located between the second end face of the annular element and a wall portion of the transmission rod; and
   a shade coiled around the rod unit.

2. The folding shade as claimed in claim 1, wherein the first plate and the second plate are made of plastic material.

3. The folding shade as claimed in claim 1, wherein when the abutting portion of the first plate abuts against the first end face, the annular element compresses the elastic element and moves along the longitudinal axis to a position aligned with an outer periphery of the reduced section, such that the annular element is located in the annular groove, and wherein when the abutting portion of the first plate does not abut against the first end face, the elastic element returns to its original position and moves along the longitudinal axis to the first coupling section, such that the annular element abuts against an outer periphery of the first coupling section.

4. The folding shade as claimed in claim 1, wherein the transmission rod includes at least one coupling groove, and wherein the limiting member includes at least one coupling portion coupled with the at least one coupling groove of the transmission rod.

5. The folding shade as claimed in claim 1, wherein the rod unit includes a tube mounted around the axle and the transmission rod, wherein an end of the shade is fixed to the tube, and wherein another end of the shade is coupled to a weight.

6. The folding shade as claimed in claim 1, wherein the transmission rod includes a connecting portion located on an end thereof distant from the first plate, wherein an end of the returning element is securely attached to the connecting portion, and wherein another end of the returning element is securely attached to an end of the axle.

7. The folding shade as claimed in claim 5, wherein the transmission rod includes a plurality of first engaging portions on an outer periphery thereof, and wherein the tube includes an inner periphery having a plurality of second engaging portions coupled with the plurality of first engaging portions.

* * * * *